June 21, 1932.  W. S. GRIFFITH  1,863,595
MACHINE FOR CEMENTING BELTING
Original Filed Feb. 1, 1927  9 Sheets-Sheet 2
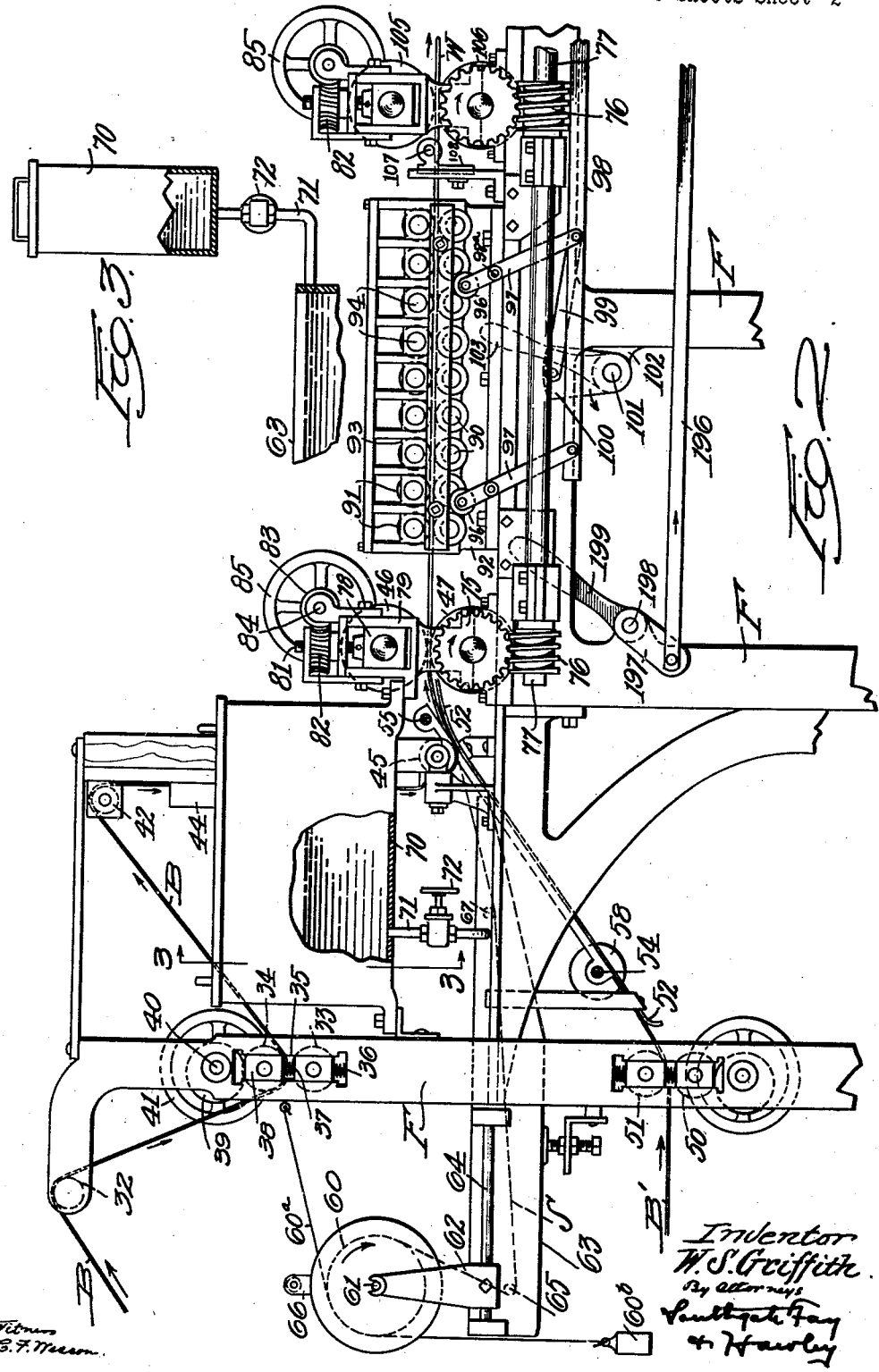

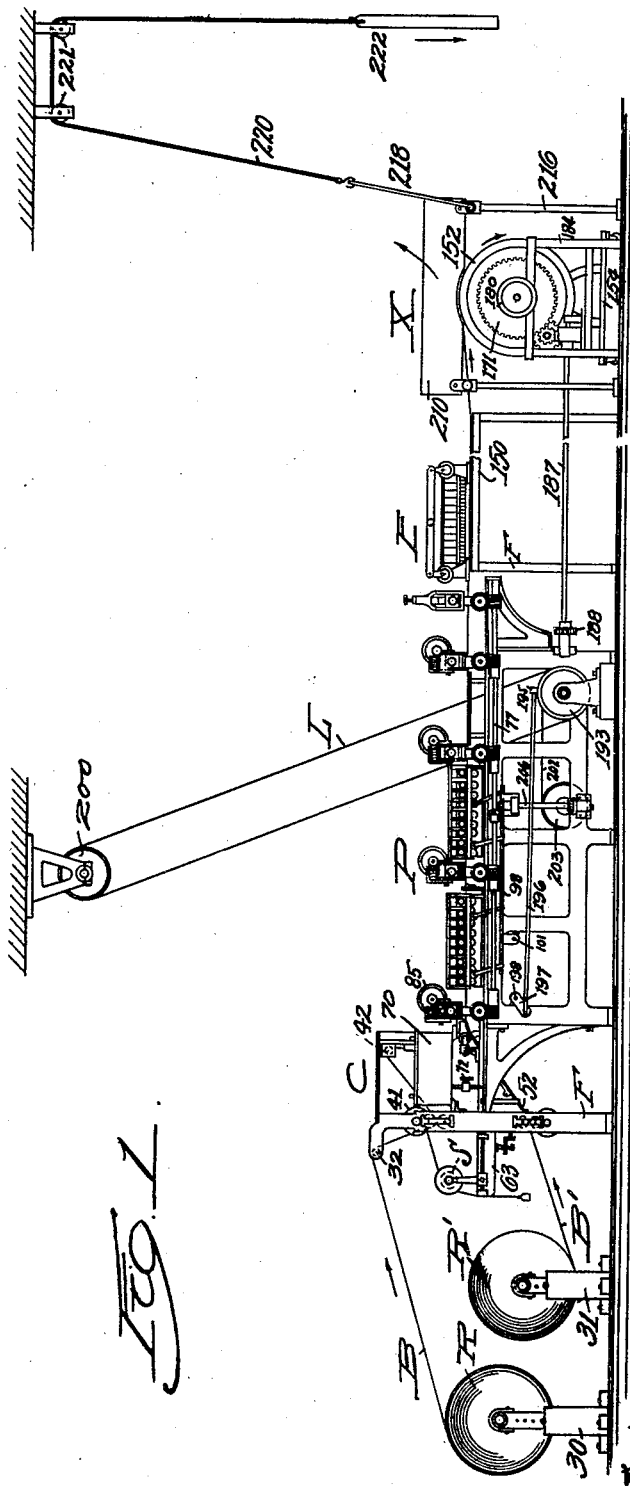

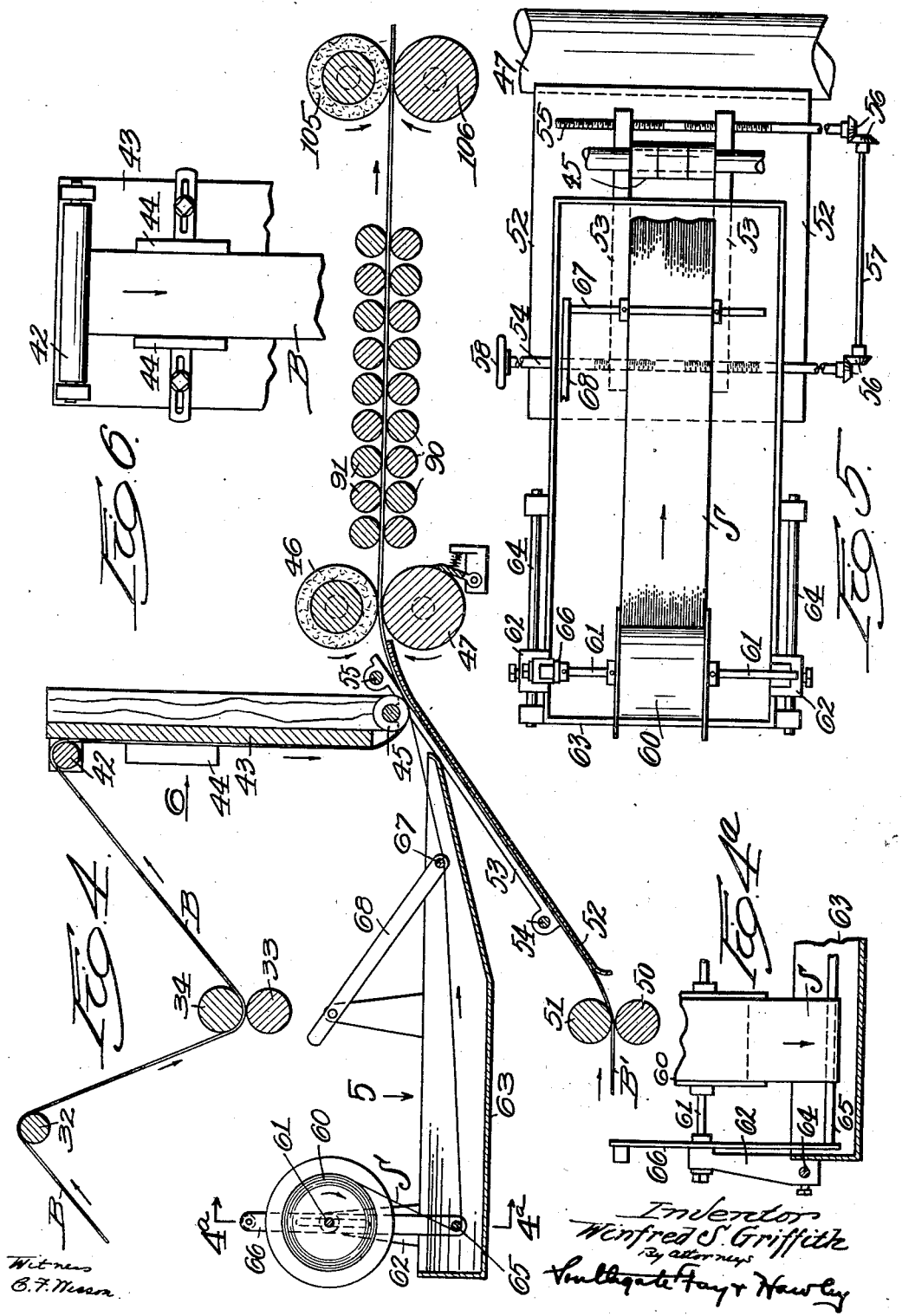

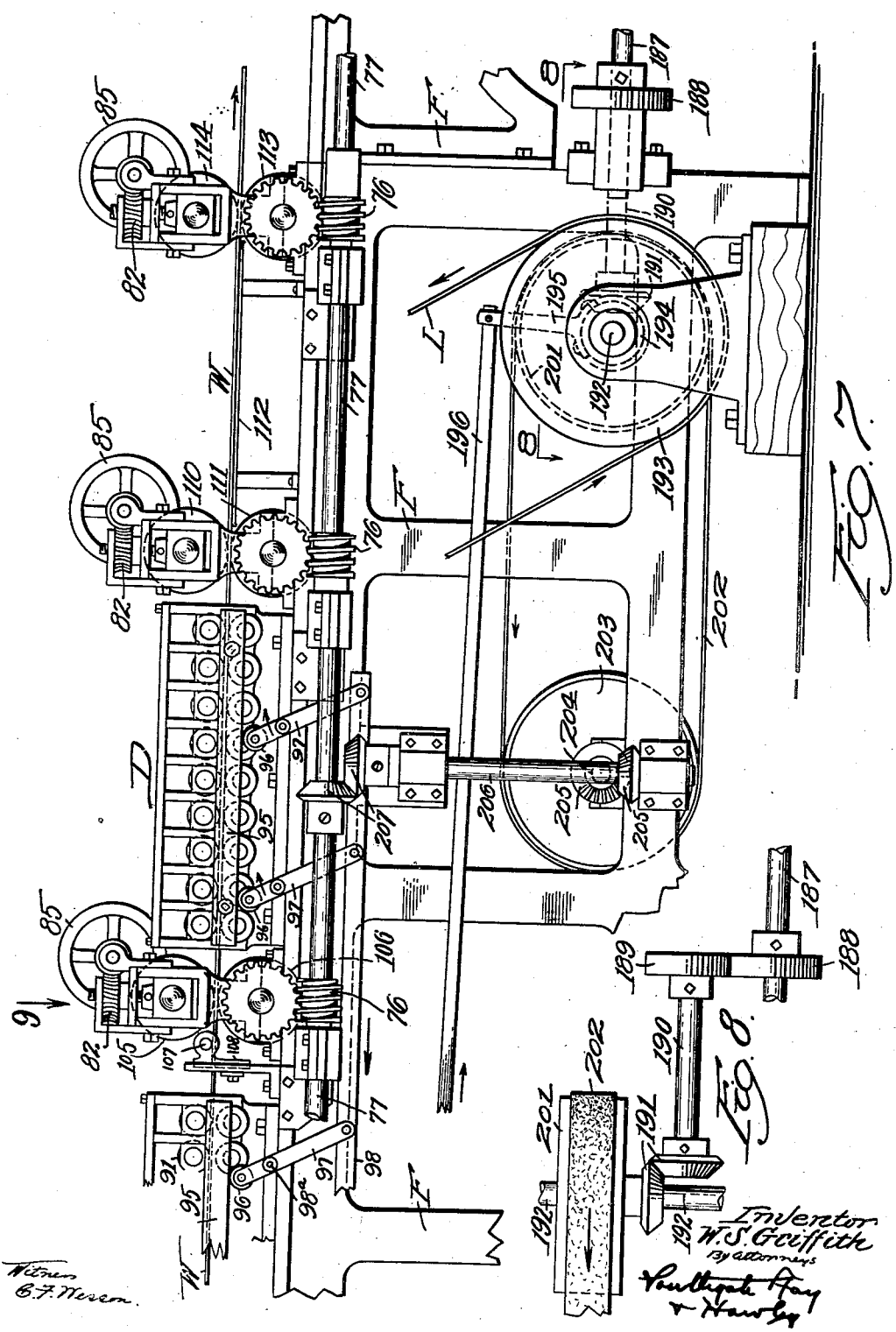

June 21, 1932.  W. S. GRIFFITH  1,863,595
MACHINE FOR CEMENTING BELTING
Original Filed Feb. 1, 1927   9 Sheets-Sheet 5
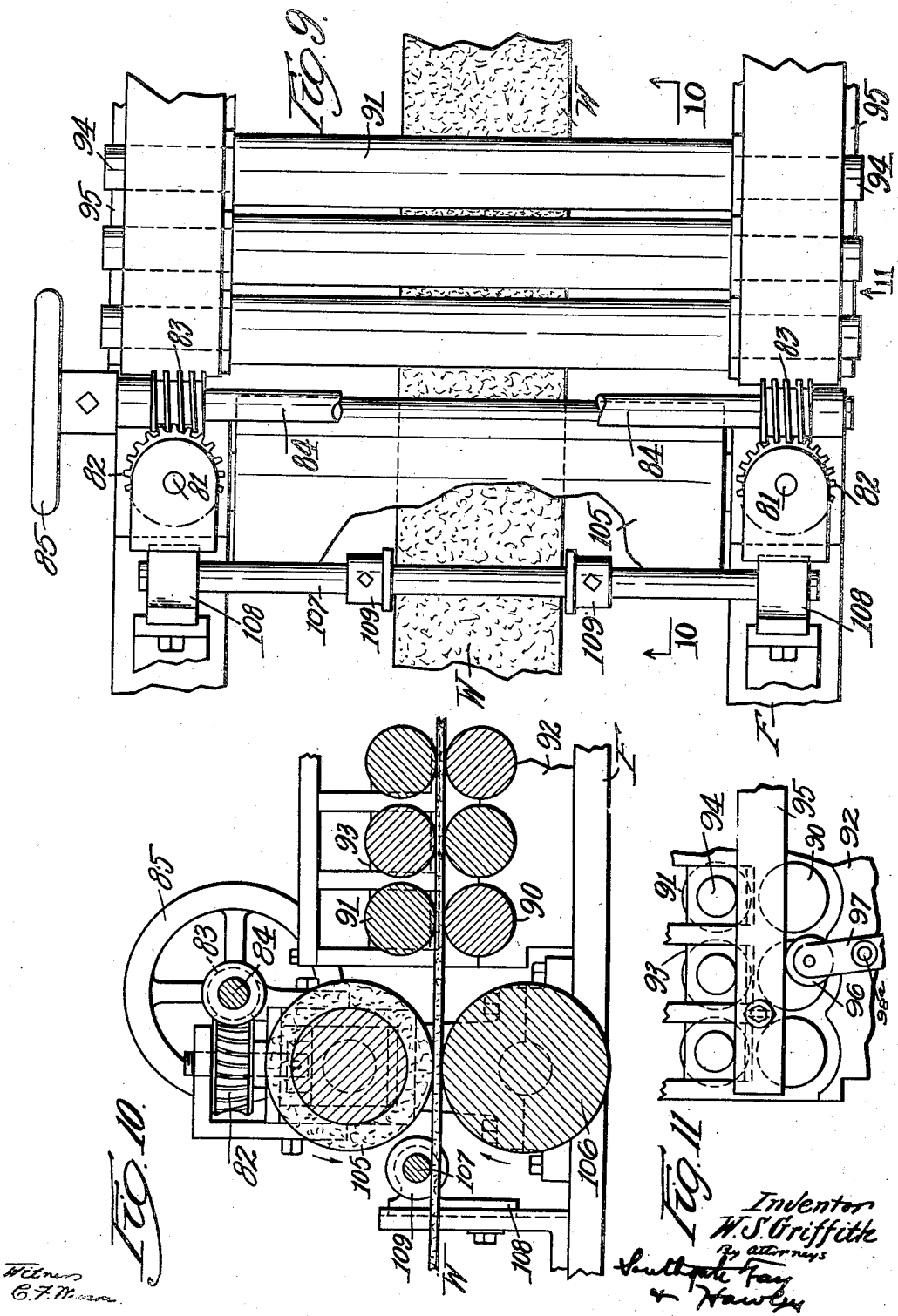

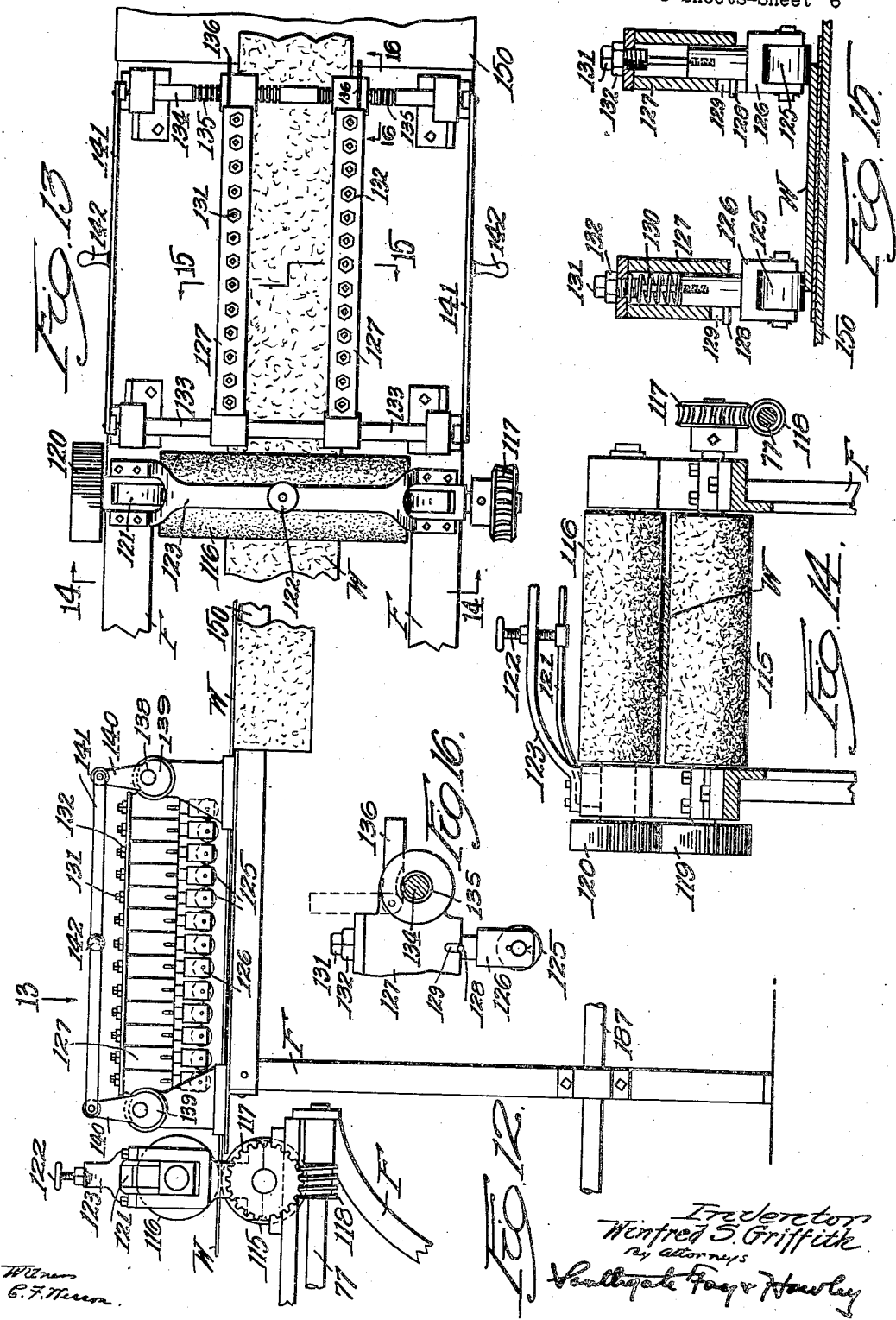

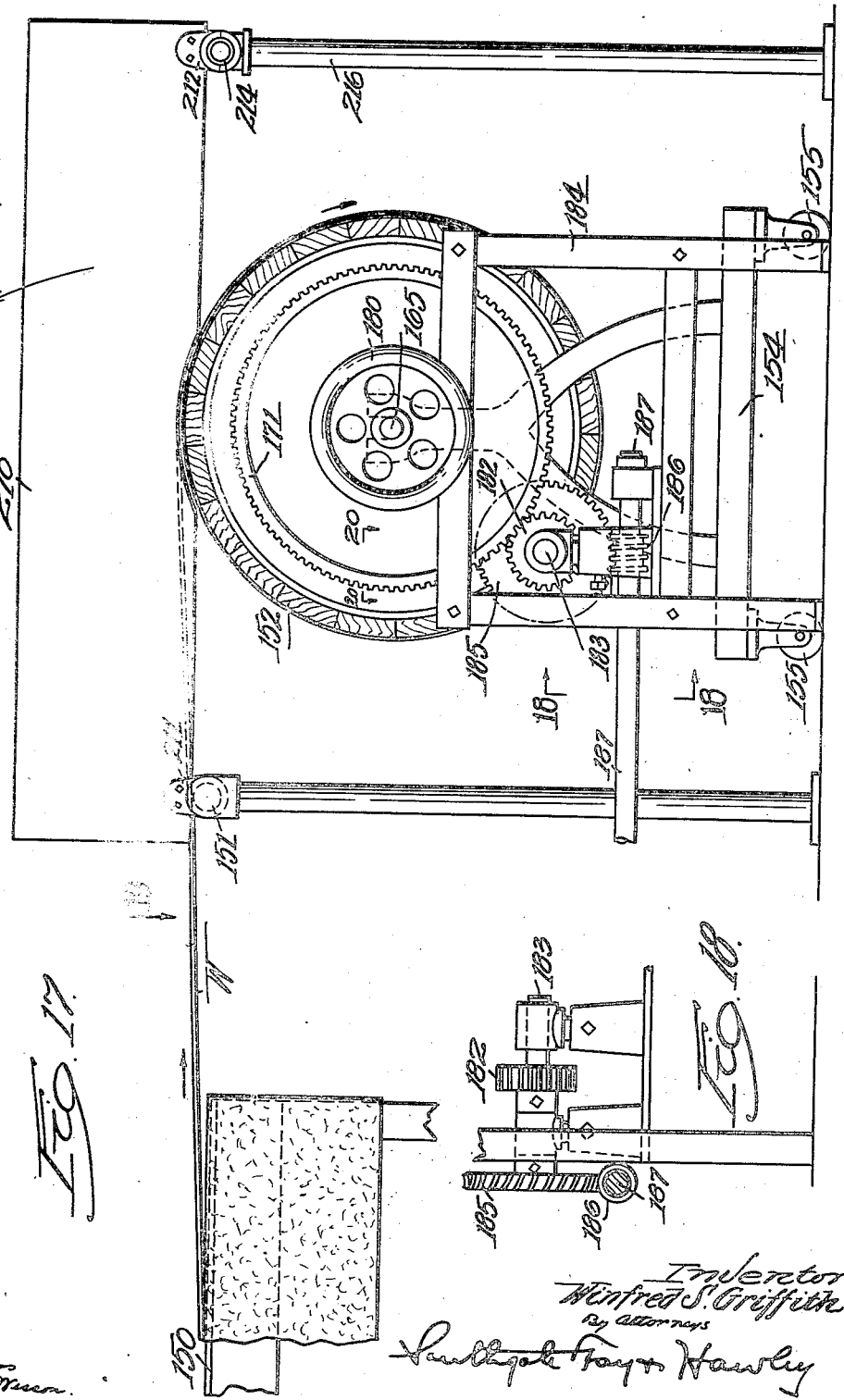

June 21, 1932. W. S. GRIFFITH 1,863,595
MACHINE FOR CEMENTING BELTING
Original Filed Feb. 1, 1927 9 Sheets-Sheet 8
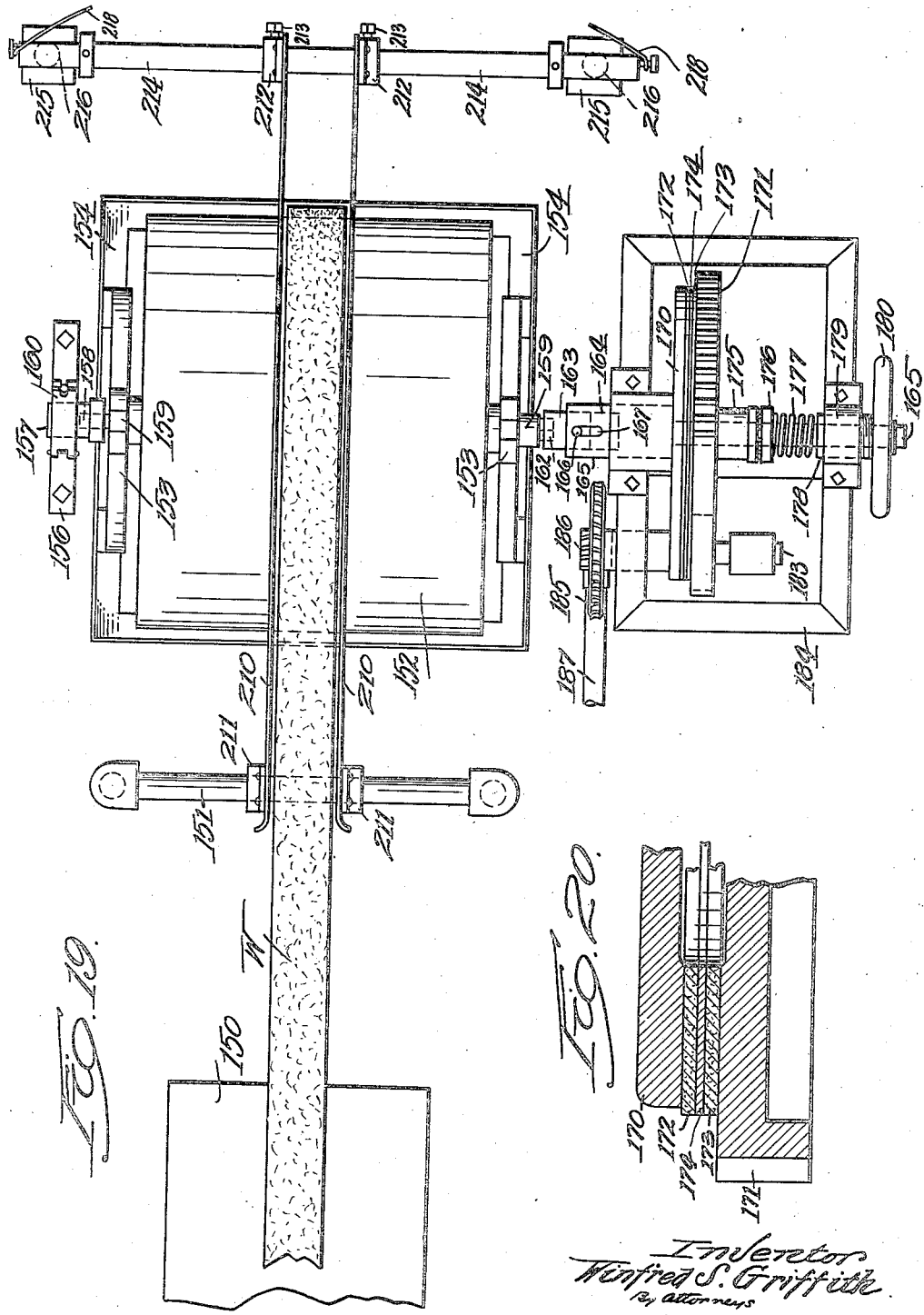

June 21, 1932.    W. S. GRIFFITH    1,863,595
MACHINE FOR CEMENTING BELTING
Original Filed Feb. 1, 1927    9 Sheets-Sheet 9
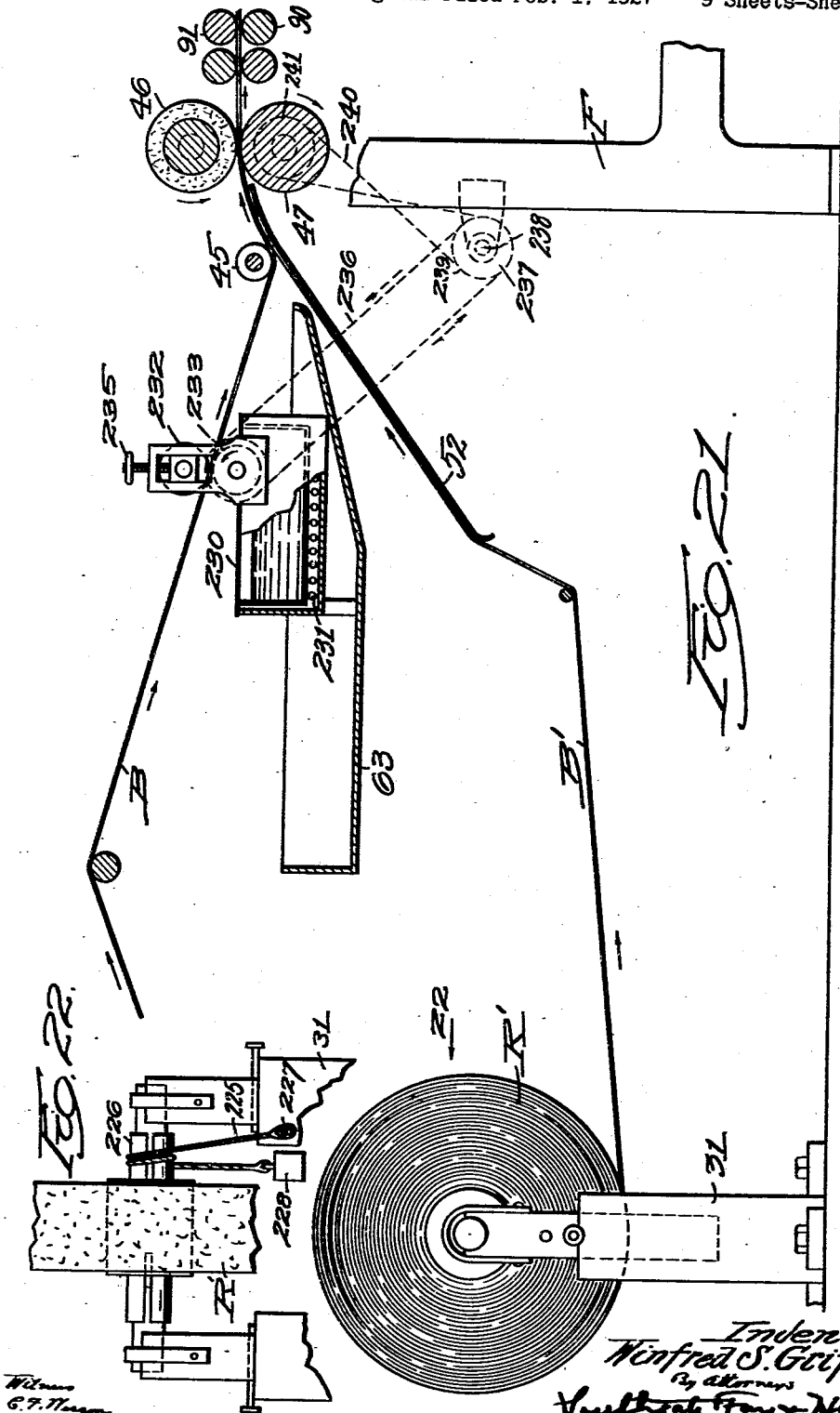

Patented June 21, 1932

1,863,595

UNITED STATES PATENT OFFICE

WINFRED S. GRIFFITH, OF WORCESTER, MASSACHUSETTS, ASSIGNOR TO GRATON & KNIGHT COMPANY, OF WORCESTER, MASSACHUSETTS, A CORPORATION OF MASSACHUSETTS

MACHINE FOR CEMENTING BELTING

Application filed February 1, 1927, Serial No. 165,214. Renewed November 3, 1931.

This invention relates to a machine particularly designed for cementing together two single layers of leather or other material to form a double belt.

It is the general object of my invention to provide a machine by which the cementing of the layers together may be carried out as a continuous operation, with a very great reduction in the time and manual labor required for such operations.

A further object is to provide a machine in which a multi-ply, waterproof belt may be continuously manufactured preferably by employing an intermediate layer of cellulose material as a cementing medium.

With these and other objects in view, important aspects of the present invention relate to the provision of devices for tensioning the layers of belt material during the cementing operation, for applying additional pressure to the edges of the belt, and for introducing the cellulose cement in a uniform layer, preferably in the form of a continuous strip suitably treated to serve as a cementing medium.

One very important feature of my improved machine relates to the provision of means by which the relative tension on the upper and lower belt layers may be varied so that the layers may be caused to travel correctly relative to each other.

My invention further relates to arrangements and combinations of parts which will be hereinafter set forth and more particularly pointed out in the appended claims.

A preferred form of the invention, together with a modification thereof, is shown in the drawings in which Fig. 1 is a side elevation of my improved cementing machine;

Fig. 2 is an enlarged side elevation of the head or cementing end portion of the machine;

Fig. 3 is a detail sectional view, taken along the line 3—3 in Fig. 2;

Fig. 4 is a sectional side elevation of parts of the mechanism shown in Fig. 2;

Fig. 4a is a detail sectional elevation, taken along the line 4a—4a in Fig. 4;

Fig. 5 is a plan view of the immersion tank, looking in the direction of the arrow 5 in Fig. 4;

Fig. 6 is a detail end elevation, looking in the direction of the arrow 6 in Fig. 4;

Fig. 7 is an enlarged side elevation of a portion of the tensioning and pressing mechanism;

Fig. 8 is a detail plan view of certain driving connections, taken substantially along the line 8—8 in Fig. 7;

Fig. 9 is an enlarged plan view of certain of the parts of the guiding and pressing mechanism;

Fig. 10 is a sectional side elevation, taken along the line 10—10 in Fig. 9;

Fig. 11 is a detail side elevation, looking in the direction of the arrow 11 in Fig. 9;

Fig. 12 is a side elevation of the mechanism for positively tensioning the belt and for pressing the edges thereof;

Fig. 13 is a plan view, looking in the direction of the arrow 13 in Fig. 12;

Fig. 14 is a sectional end elevation, taken along the line 14—14 in Fig. 13;

Fig. 15 is a detail sectional end elevation, taken along the line 15—15 in Fig. 13;

Fig. 16 is a detail sectional side elevation, taken along the line 16—16 in Fig. 13;

Fig. 17 is an enlarged side elevation of the winding mechanism.

Fig. 18 is a sectional end elevation, taken along the line 18—18 in Fig. 17;

Fig. 19 is a plan view of the winding mechanism shown in Fig. 17;

Fig. 20 is a detail sectional plan view of certain driving connections, taken along the line 20—20 in Fig. 17;

Fig. 21 is a sectional side elevation of the head end of the machine, modified for the manufacture of common or non-water-proof double belt; and Fig. 22 is a partial end elevation of one of the supply reels, looking in the direction of the arrow 22 in Fig. 21.

Referring particularly to Fig. 1, in which I have shown my improved cementing machine as a complete structure, my invention comprises essentially a cementing or head portion C, a tensioning and pressing portion P, an edge pressing portion E, and a winding portion X. The two layers of single belting B and B' are supplied from rolls R and R' and are drawn into the machine, together with a strip or layer of celluloid S, which is softened by passing through a bath containing a suitable solvent. The three layers of material are compacted together by passing through successive tension rolls and under numerous pressure rolls, and the fully cemented belt is finally delivered to the winding mechanism X where it is wound up on a large drum as will be hereinafter described. All parts of the machine are driven in suitable speed relation to each other by driving mechanism to be described, the power being furnished through a belt L (Fig. 1) or in any other convenient manner.

*Cementing head*

I will now describe in detail the mechanism for performing the cementing operation. The rolls of single belting R and R' are mounted upon suitable stands 30 and 31 (Fig. 1) fixed in position to the left of the machine, as viewed in Fig. 1.

The upper single belt layer B passes from the roll R to a guide-roll 32 (Fig. 2) in the upper part of the machine frame F and then passes downward and between a pair of tension rolls 33 and 34. The roll 33 is mounted in bearing blocks vertically slidable in openings 35 in the frame F, said blocks being supported upon heavy compression springs 36.

Additional but lighter springs 37 are provided between the bearing blocks 35 of the lower roll and the bearing blocks 38 of the upper roll. The blocks 38 are also each engaged by a cam or eccentric 39 on a shaft 40, having a hand wheel 41 mounted thereon. By turning the hand wheel 41, the upper bearing blocks 38 may be pressed downward or released, and the drag or tension upon the upper belt B may be regulated as desired.

The belt layer B passes from the tension rolls 33 and 34 over a guide-roll 42 and then downward alongside a table or plate 43 (Figs. 4 and 6) and between laterally adjustable guides 44. At the lower end of the plate 43, the belt layer B passes under an additional guide-roll 45 (Fig. 4) and is then drawn between upper and lower tension rolls 46 and 47. The upper roll 46 is preferably covered by rubber or similar material, and the lower roll 47 is commonly a metal roll. The mechanism for driving the tension roll 47 and for relatively adjusting the rolls will be hereinafter described.

The lower belt layer B' is correspondingly led between tension rolls 50 and 51 (Fig. 2) precisely similar in construction and method of adjustment to the rolls 33 and 34 previously described. The belt layer B' then passes upward along an apron 52, near the upper end of which it is united with the upper belt layer B and passes between the tension rolls 46 and 47 previously described.

Guide-bars 53 (Figs. 4 and 5) are mounted to slide laterally upon the apron 52 and may be conveniently adjusted by the mechanism shown in Fig. 5. For this purpose, the guide-bars 53 are threaded on rods 54 and 55 having right and left hand screw threads thereon and connected by bevel gears 56 and on intermediate shaft 57. The rod 54 is also provided with a hand wheel 58 by which both guide bars may be simultaneously moved toward and away from each other. Preferably the bearing surface of the guide roll 45, previously described, will be of substantially the same width as the belt in process and about equal to the distance between the guide-bars 53, as indicated in Fig. 5.

The celluloid strip S is preferably supplied in the form of a large roll 60 mounted upon a rod 61 (Figs. 4 and 5) supported in bearing brackets 62 at the sides of the tank 63. The brackets 62 are preferably mounted on guide-rods 64 so that they may be adjusted lengthwise of the tank 63 if so desired. A belt or cord 60ª and weight 60ᵇ may provide a limited tension on the strip S.

The strip S passes downward from the roll 60 to a guide-pin 65 projecting laterally from an upright bar 66 (Fig. 4a), which may be vertically adjusted to determine the depth of immersion of the strip S. The strip then passes around a second guide-pin 67 projecting from the lower end of an angularly adjustable supporting arm 68, and passes from the guide-pin 67 to the guide-roll 45 previously described, where it is drawn between the upper and lower belt layers B and B' to form the finished double belt.

The tank 63 contains a celluloid solvent of such strength, in proportion to the rate of travel of the strip S, that the celluloid will be substantially softened and rendered sticky by its passage through the solvent but without having its tensile strength unduly weakened. A supply tank 70 (Figs. 2 and 3) is preferably mounted above the tank 63 and is provided with a feed pipe 71 and valve 72 by which the loss of solvent in the tank 63 due to use or evaporation may be conveniently replaced.

*Feeding and tension mechanism*

I will now describe the mechanism for advancing the cemented belt W through the machine and for applying pressure thereto. The lower tension roll 47 is rotatably mounted in fixed bearings on the frame of the machine and is provided with a worm wheel 75 (Fig. 2) which is driven by a worm 76 mounted on a worm shaft 77 extending longitudinally of the machine and continuously rotated by driving mechanism to be described.

The upper roll 46 is freely rotatable in bearing blocks 78, vertically slidable in a slotted frame 79. A threaded stud 81 is secured to each bearing block 78 and is threaded in a worm wheel 82, rotatably mounted in the upper part of the frame 79. A separate worm wheel 82 is provided for each bearing block 78, and each worm wheel 82 is engaged by a worm 83 (Fig. 9) mounted on a cross shaft 84 having a hand wheel 85 secured thereto.

By turning the hand wheel, the worm wheels 82 will be simultaneously rotated, thus raising or lowering the sliding blocks 78 and the roll 46 supported thereby. The roll 46 may be thus adjusted in any desired relation to the roll 47, thus placing any desired pressure on the belt layers B and B' and the celluloid strip S as they are drawn between the rolls in assembled relation to form the belt W. As the roll 47 is positively rotated, while the roll 46 is freely rotated, these rolls apply a semi-positive tension to the assembled belt W. After passing between the tension rolls 46 and 47, the belt W is then acted upon by a series of idle pressure rolls 90 and 91. The construction is the same for both sets of pressor rolls and the details are shown in Figs. 9 to 11, which disclose that the lower rolls 90 rotate in fixed bearings in a stand 92 secured to the frame F of the machine. The upper rolls 91 are rotatable in bearing blocks 93, fitting in vertically extended slots or recesses in the stand 92.

The reduced outer end portions 94 of the upper rolls 91 extend outward beyond the bearing blocks 93 and are engaged on their lower sides by a release bar 95 (Fig. 11) which has a slotted connection to the stand 92 which permits limited vertical movement of the bar. The bar 95 is engaged on its lower face by rolls 96 mounted at the upper ends of lifting levers 97 (Fig. 2) which are pivoted at 98ª to the stand 92 and which are pivotally connected at their lower ends to an actuating rod 98.

The rod 98 is connected by a link 99 to an arm 100, which is secured to a cross shaft 101, mounted in brackets 102 on the frame F, and provided with a handle 103 by which the shaft may be moved angularly. Such movement of the shaft swings the levers 97 to vertical position, thus raising the lifting bar 95 and separating the upper movable rolls 91 from the lower fixed rolls 90. This manual separation of the rolls is of great convenience in threading up the machine. It will be understood that a separate actuating rod 98 is provided at each side of the machine and that a separate lifting bar 95 is provided for each end of the rolls 91. After passing through the tension rolls 46 and 47 and between the pressure rolls 90 and 91, the belt W then passes between additional tension rolls 105 and 106, shown at the right in Fig. 2. These rolls are identical in construction and operation with the rolls 46 and 47 previously described.

As the belt W approaches the tension rolls 105 and 106, it passes under a guide rod 107 (Figs. 9 and 10) which is mounted in vertically adjustable brackets 108 and which is provided with collars 109 axially adjustable thereon. These collars serve to guide the belt laterally as it travels through the machine.

The belt W then preferably passes under a second set of idle pressure rolls, indicated generally by the letter D, and between a third pair of tension rolls 110 and 111. The belt then passes over a fixed support or table 112 and between a further pair of tension rolls 113 and 114 from which point it is delivered to a pair of positively driven tension rolls 115 and 116 (Figs. 12 and 14).

These two rolls are preferably leather covered and the lower roll is provided with a worm wheel 117 engaged by a worm 118 on the shaft 77 previously described. At its opposite end, the roll 115 is provided with a gear 119 engaging a similar gear 120 on the upper roll 116. The upper roll is mounted in slidable bearing blocks which are pressed downward by a flat spring 121, extending above the roll 116 and engaged by an adjusting screw 122 threaded in a cross frame member 123.

The rolls 115 and 116 are thus positively driven and grip the belt W with any desired pressure. The positively driven tension rolls 115 and 116 are preferably rotated at the same peripheral speed as the semi-positive tension rolls previously described.

After passing the positively driven rolls 115 and 116, the belt W is drawn through an edge pressing device which will now be described. Referring particularly to Figs. 12–16, I have provided a series of rollers 125 (Fig. 15) positioned laterally to engage the edge portions of the belt W.

Each roll 125 is freely rotatable in a holder 126, mounted for vertical sliding movement in spaced recesses in a roll frame 127. A pin 128 projects laterally from each holder 126 and is slidable in a slot 129 in the frame 127, thus preventing angular movement of the roll holders. Certain holders are pressed downward by compression springs 130 but the downward movement is limited by headed studs 131, adjustably threaded in the shanks of the holders and extending upward through bearing nuts 132. By adjusting the studs 131, the extreme lower position of the holders may be determined.

The roll frames 127 are slidably mounted on cross rods 133 and 134 (Fig. 13). The rod 134 is provided with circumferential grooves 135, and each frame 127 is provided with a latch 136 (Fig. 16) mounted in a slot in the end of the frame and adapted to be swung downward to engage a selected groove 135 and thus hold its roller frame in laterally adjusted position.

The ends of the cross shafts 133 and 134 are supported in bearing openings 138 (Fig. 12) eccentrically positioned in adjusting members 139. Each member 139 is provided with an arm 140, and the arms 140 are connected by a link 141 having a handle 142 provided thereon. When the parts are in the idle position indicated in Fig. 12, the rolls 125 are lifted above the belt W and exert no pressure thereon. When the adjusting members 139 are moved angularly, the frames 127 move downward, causing the rolls 125 to engage the belt with any desired pressure.

While I may provide each roll 125 and holder 126 with springs 130, as previously described, it is usually desirable to provide only a few of the holders with the compression springs, as indicated at the left in Fig. 15, and to permit the greater number of rollers 125 to be pressed against the belt merely by gravity, as shown at the right in Fig. 15. The operation of the edge rollers causes the edges of the belt W to be very firmly pressed together and avoids the very objectionable openings sometimes seen between belt layers at the edges of a double belt.

*Drying table and winding mechanism*

As the cemented belt leaves the edge pressing mechanism E, it is drawn over a table 150 which is preferably covered with canvas or other similar material, and which is of substantial length, so as to permit additional time for the setting of the cement before the belt is wound up into a roll for removal from the machine.

At the end of the table 150, the belt W passes over a guide bar 151 (Fig. 17) and is wound up on a drum 152. The drum is mounted on a shaft 159, rotatable in open bearings 153 (Fig. 19) on a frame 154 supported on rollers 155. This construction permits a filled drum to be readily removed and quickly replaced by an empty drum, without substantially delaying the operation of the machine.

A fixed support 156 (Fig. 19) is secured to the floor at the rear side of the drum 152 and provides a bearing for a sleeve 157, which fits loosely over an extension 158 of the drum shaft 159. The sleeve 157 is held from displacement by a cap 160 hinged to the support 156.

At its opposite end, the drum shaft 159 is provided with a squared end 162 adapted to be received in a square opening in the end of a sliding collar 163. The collar 163 is axially movable in a recess 164 in the end of a driving shaft 165. A pin 166 in the collar 163 extends through a slot 167 in the shaft 165 and prevents relative angular movement of the sliding collar in the drive shaft.

When the collar is moved outwardly as shown in Fig. 19, a driving connection to the drum is established, and when the collar is moved away from the drum and the sleeve 157 is removed from the opposite end of the drum shaft, the drum and its supporting frame may be readily removed and replaced as previously described.

A friction disc 170 is secured to the shaft 165 and a drive gear 171 is rotatably mounted on the shaft adjacent the disc 170. Friction rings 172, 173 and a friction plate 174 (Fig. 20) are provided between the adjacent faces of the gear 171 and the disc 170. Preferably the rings 172 and 173 are of fibre or leather, and the plate 174 is of metal. The ring 172 and plate 174 are secured to the disc 170 and rotate therewith, while the ring 173 is secured to the side of the gear 171.

The gear 171 is provided with a hub 175 (Fig. 19) which is engaged by a ball or roller thrust bearing 176 which is yieldingly forced against the hub 175 by a heavy spring 177. A sleeve 178 is threaded in a bearing block 179 and provides a support for the outer end of the shaft 165. The sleeve 178 also engages the end of the spring 177 and may be adjusted by a hand wheel 180 to increase or decrease the pressure of the spring.

The gear 171 (Fig. 17) is engaged by a pinion 182 (Fig. 18) mounted on a cross shaft 183 supported in bearings in an outer frame 184 on which the shaft 165 is supported. A worm wheel 185 is secured to the rear end of the shaft 183 and is engaged by a worm 186 (Fig. 17) on a worm shaft 187. The shaft 187 extends longitudinally of the machine toward the head end thereof and is provided at its opposite end with a gear 188 (Figs. 7 and 8) meshing with a second gear 189 on the short shaft 190, which in turn is connected by bevel gears 191 to the main drive shaft 192.

A driving pulley 193 is loosely rotatable on the shaft 192 and may be connected thereto by any suitable friction clutch 194, controlled by a clutch lever 195 and clutch bar 196. The bar 196 is pivotally connected to an arm 197 (Fig. 1) on a rock shaft 198 which extends to the rear side of the machine and is provided with a suitable clutch-operating handle 199 (Fig. 2). The pulley 193 may be driven by a belt L (Fig. 1) from a drive shaft or motor 200.

The drive shaft 192 (Fig. 7) is also provided with a pulley 201 connected by a belt 202 to a pulley 203 on a cross shaft 204. The shaft 204 is connected by bevel gears 205 to an upright shaft 206, which in turn is connected by bevel gears 207 to the worm shaft 77 previously described.

The clutch handle 199 thus controls the starting and stopping of the whole machine, including both the positive and the semi-positive tension rolls, and also the winding mechanism. The speed ratio is such that the winding gear 171 tends to rotate the drum 152 slightly faster than is necessary to take up the belt delivered by the tension rolls. The excess speed of the gear 171 is taken care of by the friction connection between the gear 171 and the disc 170, so that the drum 152 is yieldingly rotated at exactly the right speed to take up the belt as delivered from the tension rolls, while at the same time the friction connections place a continuous additional tension upon the belt which is thus under tension all the time from one end of the machine to the other.

In Figs. 17 and 19, I have illustrated the special provision which I have made for guiding belts of different widths on the drum 152 and for insuring accurate winding of the belt in a roll. For this purpose, guide plates 210 are mounted on collars 211 (Fig. 19) slidable and pivoted on the guide roll 151. The swinging ends of the guide plates 210 are secured to collars 212, provided with set screws 213 by which they may be laterally adjusted and secured in position on a cross rod 214, resting in open bearings 215 at the top of fixed posts 216 (Fig. 17). Ropes 218 (Fig. 19) may be secured to the opposite ends of the cross rod 214 and may be joined to a rope 220 (Fig. 1), passing over guide pulleys 221, and having a weight 222 secured thereto. The weight 222 counteracts the weight of the guide-plates 210, permitting them to be easily swung upward and maintaining them in raised position during the removal and replacement of a winding drum.

Having thus described one form of my invention and the details of construction thereof, it is believed that the operation of the machine will be readily apparent. It will be noted that the operation is continuous and that the two layers of belt B and B' and the strip of celluloid S are continuously drawn between the tension rollers 46 and 47 and are drawn under tension throughout the length of the machine, being successively acted upon by one or more sets of pressure rolls P (Fig. 1) and by successive positive and semi-positive tension rolls, and also preferably by one or more sets of edge pressing rolls E, before delivery of the belt still under tension to the drying table 150 and winding drum 152. It should be noted also that the belt layers B and B' are preferably under tension before they are assembled with the celluloid strip and fed between the tension rolls 46 and 47. Preferably also the celluloid strip itself is under slight tension.

By adjusting the preliminary tension upon the belt layer B or B', the feeding movement of these layers may be slightly varied, so that the thick and thin places in the single layers may be properly associated to form a double belt of substantially uniform thickness. For this purpose, the two single layers are commonly provided with marks at frequent intervals by which the operator may easily determine the proper adjusted relation.

By providing a solution of suitable strength and composition in the tank 63, and by suitably regulating the speed of the apparatus, the celluloid strip will be softened but not too greatly weakened by its passage through the solution, and will be in just the right state of adhesiveness to effectively cement the two layers of leather together and form a waterproof double belt.

The cementing of the layers together under tension is of very great importance, as the tension is similar to that experienced in use, and belts united under tension are found to be much less liable to stretch in use than belts manufactured by the old process and without tension.

While I have indicated the preliminary tension as applied by the tension rolls 34 and 35 or 50 and 51, I may also apply the preliminary tension direct to the rolls R and R', from which the belt layers B and B' are drawn. Such a construction is indicated in Fig. 22, in which a rope 225 (Fig. 22) is wound one or more times around the hub 226 of the roll R or R'. One end of the rope is secured to a fixed point 227 on the support 31 and the free end of the rope is provided with a weight 228. Either the size of the weight 228 or the number of turns of the rope on the hub may be varied, to increase or decrease the friction as desired.

While my improved machine is particularly designed for the manufacture of waterproof belt, with the use of a celluloid strip as a cementing medium, the machine is also well adapted for the manufacture of ordinary or glued belt, for which purpose the slightly modified construction shown in Fig. 21 may be used. For this purpose, a glue tank 230 is mounted in the tank 63 previously described, and is provided with a suitable heating coil 231. The belt B passes between a guide roll 232 and a coating roll 233, these rolls being relatively adjustable toward or from each other by adjusting screws 235.

The roll 233 dips into the glue in the tank 230 and engages the under side of the belt layer B, applying a smooth and even coating of glue thereto. The belt layer B is then delivered under the guide-roll 45 previously described, where it engages the layer B' which is drawn upward over the apron 52 as in the previous form. The assembled layers are then drawn forward by the tension rolls 46 and 47 and are acted upon by the pressure rolls 90 and 91 as in the manufacture of waterproof belt, the operation of the machine from this point on being identical.

The coating roller 233 is connected by a belt 236 (Fig. 21) to a pulley 237 on a cross shaft 238, which in turn is connected by a pulley 239 and cross belt 240 to a pulley 241 on the tension roll 47. The coating roller 233 is thus rotated in a definite speed relation to the tension roll 47 and to the travel of the belt.

Obviously either the friction device shown in Fig. 22 or the friction rolls shown in Fig. 2 may be used to tension the belts, either for water-proof cementing or for gluing.

Having thus described my invention and the advantages thereof I do not wish to be limited to the details herein disclosed otherwise than as set forth in the claims, but what I claim is:—

1. A belt cementing machine comprising means to apply tension to two separate belt layers, means to supply cementing material thereto, means to assemble said belt and to apply additional tension thereto as a continuous operation, and additional means to repeatedly apply rolling pressure after assembling to said assembled belt, at points beyond the assembling point.

2. A belt cementing machine comprising means to apply tension to two separate belt layers, means to supply cementing material thereto, means to assemble said belt and to apply additional tension thereto as a continuous operation, and additional means to repeatedly apply rolling pressure to the edge portions only of said assembled belt.

3. A belt cementing machine comprising means to apply tension to two separate belt layers, means to supply a continuous strip of cellulose cementing material between said belt layers and to assemble said layers and strip, and means to apply pressure to the assembled belt beyond the assembling point and while said belt is still under tension.

4. A belt cementing machine comprising means to apply tension to two separate belt layers, means to supply a continuous strip of cellulose cementing material between said belt layers, means to apply additional positive tension to the assembled and cemented belt, and means to apply semi-positive tension to the assembled belt between the point of assembly and the point of positive tensioning.

5. A belt cementing machine comprising means to apply tension to two separate belt layers, means to supply a continuous strip of cellulose cementing material between said belt layers, means to apply additional positive tension to the assembled and cemented belt, means to apply semi-positive tension to the assembled belt between the point of assembly and the point of positive tensioning, and additional freely-rotatable pressure rolls engaging said assembled belt between successive points of application of semi-positive tension.

6. A belt cementing machine comprising means to apply tension to two separate belt layers, means to supply a continuous strip of cellulose cementing material between said belt layers, means to apply pressure to the assembled belt while still under tension, and means to apply additional pressure to the edge portions only of said belt.

7. A belt cementing machine comprising means to apply tension to two separate belt layers, means to supply a continuous strip of cellulose cementing material between said belt layers and to assemble said layers and strip, means to apply pressure to the assembled belt beyond the assembling point and while said belt is still under tension, and adjustable means to guide the belt layers and celluloid strip laterally to the point of assembly.

8. A belt cementing machine comprising means to apply tension to two separate belt layers, means to supply a continuous strip of cellulose cementing material between said belt layers and to assemble said layers and strip, means to apply pressure to the assembled belt beyond the assembling point and while said belt is still under tension, and means to wind said belt under tension.

9. In a continuous belt cementing machine, belt cementing mechanism, belt tensioning and pressing mechanism, a longitudinally extended drying table, and belt-winding mechanism effective to draw the belt under tension from said tensioning and pressing mechanism over said table.

10. In a belt cementing machine, a tank containing a cellulose solvent, means to guide a continuous strip of cellulose through said solvent, means to assemble the softened cellulose between upper and lower belt layers and to assemble said layers and strip, and means to apply tension and pressure to the assembled belt.

11. In a belt cementing machine, a pair of assembling rolls, means to supply upper and lower belt layers to said rolls, said layers having cementing material interposed between them, and means to retard and tension the belt layers as they approach said assembling rolls, said retarding and tensioning means comprising a pair of rolls for each belt layer, means to yieldingly press said rolls together, and manual means to adjust the pressure of said rolls on said belt layers.

12. In a belt-cementing machine, having means to apply tension to two separate belt layers, means to supply cementing material thereto, means to assemble said belt, and means to apply pressure to said belt, comprising a series of pressure rolls rotatable in fixed bearings, and a series of rolls associated therewith and means to raise said second series of rolls simultaneously to permit insertion of a belt between said rolls, each of said series of rolls being operatively beyond said assembling means.

13. In a belt cementing machine, having means to apply tension to two separate belt layers, means to supply cementing material thereto, means to assemble said belt, and means to apply pressure to said belt, comprising a plurality of freely rotatable pressure rolls arranged in successive closely adjacent pairs, each pair comprising a lower roll rotatable in fixed bearings and a movably mounted upper roll resting freely thereon, and means to raise all of said upper rolls simultaneously to permit insertion of a belt thereunder, said pressure rolls being operatively beyond said assembling means.

14. In a belt cementing machine, having means to apply tension to two separate belt layers, means to supply cementing material thereto, means to assemble said belt, and means to apply pressure to said belt, comprising a plurality of freely rotatable pressure rolls arranged in successive series of closely adjacent pairs, each pair comprising a lower roll rotatable in fixed bearings and a movably mounted upper roll resting freely thereon, a lifting bar for each end of each series of upper rolls, and means to raise all of said bars simultaneously, said pressure rolls being operatively beyond said assembling means.

15. In a continuous belt cementing machine, a plurality of successive pairs of semi-positive tensioning rolls, each comprising a positively driven lower roll and a freely rotatable upper roll, means to rotate all of said lower rolls in unison, and a single device for each pair of rolls effective to positively raise and lower both ends of the upper roll to adjust the tension on the belt.

16. In a continuous belt cementing machine, a plurality of successive pairs of semi-positive tensioning rolls, each comprising a positively driven lower roll and a freely rotatable upper roll, and means to apply rolling pressure to the belt between said pairs of tension rolls.

17. In a belt-cementing machine, an edge pressing mechanism comprising a plurality of rollers, a separate vertically movable holder for each roller, and springs effective to press certain of said rollers on the belt edges with increased pressure.

18. In a continuous belt cementing machine, an edge pressing mechanism comprising a plurality of rollers, a separate vertically movable holder for each roller, a pair of frame members for said holders, supporting bars on which said frame members are laterally adjustable, and means to hold said members in adjusted spaced relation.

19. In a continuous belt cementing machine, an edge pressing mechanism comprising a plurality of rollers, a separate vertically movable holder for each roller, a pair of frame members for said holders, supporting bars on which said frame members are laterally adjustable, one of said bars having annular grooves therein, and said frame members being laterally slidable on said bars, and a latch on each frame member effective to cooperate with one of said grooves to lock said frame member in laterally adjusted position.

20. In a continuous belt cementing machine, belt cementing mechanism, belt tensioning and pressing mechanism, a belt-winding drum, driving mechanism therefor, and a friction driving connection between said drum and said driving mechanism, whereby the driving mechanism may rotate at greater speed than the drum and will exert forwarding tension thereon.

21. In a continuous belt cementing machine, belt cementing mechanism, belt tensioning and pressing mechanism, a belt-winding drum, driving mechanism therefor, a friction driving connection between said drum and said driving mechanism, whereby the driving mechanism may rotate at greater speed than the drum and will exert forwarding tension thereon, and means to adjust the driving friction.

22. A belt cementing machine comprising means to apply tension to two separate belt layers, means to supply a continuous strip of cellulose cementing material under tension between said belt layers, means to assemble said layers and strip, and means to apply pressure to said assembled belt beyond the assembling point and while said belt is still under tension.

23. A belt cementing machine comprising a belt tensioning mechanism, means to feed separate belt layers, means to supply a continuous strip of cementing material under tension between said belt layers, means to assemble said layers and strip, and means to apply pressure to the assembled belt beyond the assembling point and while said belt is still under tension.

24. A belt cementing machine comprising a belt tensioning mechanism, means to feed separate belt layers, means to supply a continuous strip of cementing material under tension between said belt layers, means to assemble said layers and strip, means to apply pressure to the assembled belt while still under tension, and means to apply additional pressure to the edge portion of said belt.

25. A belt cementing machine, comprising means to apply tension to two separate belt layers, means to soften a strip of cellulose with a solvent bath, means to supply said softened strip continuously between said belt layers, means to assemble said layers and strip, and means to apply pressure to the assembled belt while still under tension.

26. A belt cementing machine, comprising means to apply tension to two separate belt layers, means to soften a strip of cellulose with a solvent bath, means to supply said softened strip continuously between said belt layers, means to assemble said layers and strip, and means to apply pressure to the assembled belt while still under tension, means to apply additional tension to the assembled belt, and means to wind said belt under tension.

In testimony whereof I have hereunto affixed my signature.

WINFRED S. GRIFFITH.